15# United States Patent [19]

Worden

[11] Patent Number: 5,163,722
[45] Date of Patent: Nov. 17, 1992

[54] CONNECTION APPARATUS WITH FERRULE FORMING STRUCTURE

[75] Inventor: Raymond D. Worden, Houston, Tex.

[73] Assignee: Ruska Laboratories, Inc., Houston, Tex.

[21] Appl. No.: 736,516

[22] Filed: Jul. 26, 1991

[51] Int. Cl.5 .............................................. F16L 51/00
[52] U.S. Cl. ...................... 285/375; 285/279; 285/101; 285/342; 285/343; 285/348; 285/187
[58] Field of Search .............. 285/375, 279, 101, 342, 285/343, 348, 267–269, 279, 911, 187, 333.4; 403/32

[56] References Cited

U.S. PATENT DOCUMENTS

| 820,774 | 5/1906 | Flyberg | 285/375 X |
|---|---|---|---|
| 951,889 | 3/1910 | Teur | 285/375 X |
| 966,198 | 8/1910 | Haig et al. | 285/375 X |
| 1,383,127 | 6/1921 | Kraft | 285/375 X |
| 1,810,115 | 3/1927 | Wahl et al. | 285/375 X |
| 1,883,283 | 10/1932 | Zerk | 285/343 X |
| 1,937,865 | 12/1933 | Baker | 285/187 |
| 2,129,704 | 5/1934 | Meyer | 285/375 X |
| 2,476,777 | 10/1945 | Smith | 285/375 X |
| 4,281,679 | 8/1981 | Stearns | 285/342 X |
| 4,669,763 | 6/1987 | Phillips | 285/911 X |
| 4,787,656 | 11/1988 | Ryder | 285/342 X |
| 4,991,883 | 2/1991 | Worden | 285/334.4 |

Primary Examiner—Randolph A. Reese
Assistant Examiner—Timothy Aberle
Attorney, Agent, or Firm—Browning, Bushman, Anderson & Brookhart

[57] ABSTRACT

An improved apparatus for connecting first and second conduits having first and second bores, respectively to provide communication between the first and second bores which may be used with temperatures and/or wide variations in temperature. While a biasing element is used to provide a sealing ferrule with sufficient force to seal the second conduit, a ferrule forming screw may be used to form an initial seal if a conduit is used that is undersize with respect to the ferrule. A quick-lock adaptor is also attached to the base of the connector which adapts the connector for use with standard tubing fittings.

11 Claims, 1 Drawing Sheet

CONNECTION APPARATUS WITH FERRULE FORMING STRUCTURE

BACKGROUND OF THE INVENTION

1. Field of the Invention

The present invention relates to an improved apparatus for effecting gas-tight communications between first and second members having bores for the passage of fluid. More particularly, the present invention relates to an improved high-temperature, low-pressure connection for affecting fluid-tight communication between such members.

2. Description of the Background

There are numerous types of apparatus such as, for example, analytical instrumentation used in laboratories, chemical and refining plants and the like, which require connection of a first member through which is transported a fluid, such as a gas, to a second member.

One exemplary example of such a connection is shown in U.S. Pat. No. 4,991,883 to R. D. Worden, which is incorporated herein by reference. The connection shown in the '883 patent provides a fluid tight connection in spite of very wide temperature changes and operation at high temperatures which subjects the mechanical components of this connection to considerable expansion and contraction. In a preferred embodiment of the invention disclosed in the '883 patent, a fused quartz spring is used as a biasing element which maintains a constant biasing force onto a sealing ferrule which seals between an inner conduit containing a fluid and an outer sealing surface to maintain the seal in the presence of wide temperature variations and/or operation at high temperatures.

On occasion, it is desirable to use a fluid carrying conduit that is undersize with respect to the sealing ferrule. While a quartz spring provides ample force to maintain sealing pressure during wide temperature variations, such a spring may not be strong enough to make an initial seal with an undersize conduit. An apparatus which would create an initial seal after which sealing could be maintained by the quartz spring would be highly beneficial.

High temperature connections are often awkward to work with largely because they are difficult to quickly adapt to standard tubing connectors. It has not been possible in the past to make a quick-lock adaptor that could be used with any standard tubing fitting because of the wide variations in temperature that these connectors experience. The wide variations in temperature and/or operations at high temperatures are likely to cause mechanical failure of connectors operating in this environment so that quick-lock adapters which could fit to standard tubing fittings have been generally unfeasible.

Consequently, a need exists for improvements in high temperature connections and/or connectors which experience wide variations temperatures. Those skilled in the art have long sought and will appreciate the novel features of the present invention which solves these problems.

SUMMARY OF THE INVENTION

An object of the present invention is to provide an improved, high temperature connector which may use a high temperature biasing means to apply a constant force on a sealing ferrule when using an undersize conduit with respect to the sealing ferrule.

Another object of the present invention is to provide a quick-lock adaptor for high temperature connectors that permits a speedy connection to any standard tubing fitting.

The above and other objects of the present invention will become apparent from the drawings, the description herein and the appended claims.

A preferred embodiment of the present invention provides a ferrule forming screw which can be used to apply sufficient force on the seal ferrule to create an initial seal around an undersize conduit. After an initial seal is made, a biasing spring can be used thereafter to maintain the seal as the connection is subject to high temperatures and/or wide variations in temperatures. In operation, the ferrule forming screw may be backed-off after an initial seal is made. In a preferred embodiment of the present invention, a spring bias is used to secure a locking pin into a recessed portion of a groove utilizing the same high-temperature biasing spring which is used to maintain sealing force during high temperature operations during wide variations in temperature.

BRIEF DESCRIPTION OF THE DRAWINGS

Other features and intended advantages of the present invention will be readily apparent by the references to the following detailed description in connection with the accompanying drawing, wherein.

Figure 1:
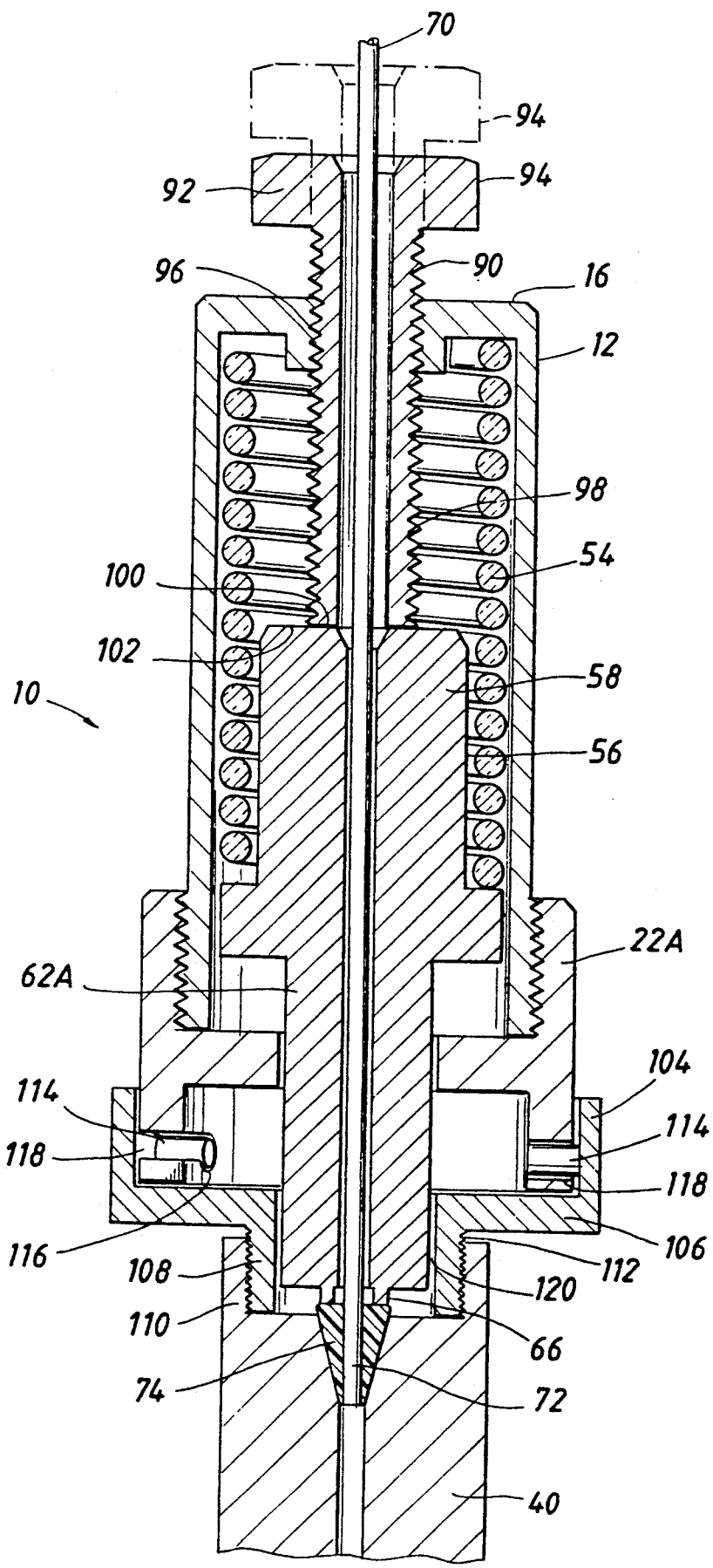
FIG. 1 is a side elevational view, in section, showing an improved connector in accord with the present invention.

While the invention will be described in connection with the presently preferred embodiment, it will be understood that it is not intended to limit the invention to this embodiment. On the contrary, it is intended to cover all alternatives, modifications and equivalents as may be included in the spirit of the invention and as defined in the appended claims.

DETAILED DESCRIPTION OF THE PREFERRED EMBODIMENTS

The present invention combines and improves on the advantages of a quartz spring biased high temperature connector in a new, novel connector which employs a ferrule forming screw to make an initial seal between a ferrule and a slightly undersize fluid conduit. An additional significant feature of the present invention is a quick-lock adaptor that can be used with standard tubing fittings so that even a high temperature connection can be readily hooked up for various purposes such as with a gas chromatograph in a pyrolytic analysis system.

The main internal components of the improved high temperature connection 10 are seen in FIG. 1. Ferrule forming screw 92 extends through cap end wall 16 and through the interior portion of cap 12 so that it is adjacent follower 56. If a slightly undersize conduit 70 with respect to ferrule 74 is used, then ferrule forming screw 92 can be used to create an initial seal with conduit end portion 72. For this purpose, ferrule forming screw has a thread portion 90 which engages cap wall threaded bore 96. As ferrule forming screw head 94 is rotated, ferrule forming screw thrust surface 100 presses against follower thrust surface 102. Follower cylindrical portion 58 and follower extended cylindrical portion 62A transmit this pressure to boss 66. In turn, boss 66 presses against ferrule 74 to form ferrule 74 to create an initial seal with a slightly undersize conduit end portion 72. Ferrule 74 is preferably made of a deformable material. The term "deformable" as used herein refers to a material which, under compression, deforms to the extent necessary to achieve a gas-tight seal between the ferrule and the engaged surface or surfaces.

This invention shows tubing adaptor receiver 104 used to adapt connector 10 to conduit 40 by forming a quick-lock attachment to base 22A. Adaptor nozzle 108 has threads 112 which mate to conduit threaded portion 110. It is understood that other connections could be made at this point such as a swage tubing fitting. Adaptor receiver portion 106 accommodates base 22A.

Base 22A has grooves 118 into which adaptor pins 114 project. Each groove 118 has a recessed portion 116 into which pins 114 lock. A high temperature biasing means may be provided to hold pin 114 into recessed portion 116. For this purpose quartz compressing spring 54 can be used for a dual purpose of not only providing sealing bias for ferrule 74 but can also be used as bias to hold pins 114 into recessed portions 116. In operation, connector 10 is placed into adaptor receiver portion 106 so that openings in grooves 118 are lined up with locking pins 114. Subsequently a quick rotation of connector 10 places locking pins 114 in groove recessed portions 116. Locking pins 114 are locked into recessed portion 116 by the biasing force of quartz compression spring 54. Grooves 118 may have been several shapes. In a preferred embodiment, grooves 188 are L-shaped so that pins 114 first enter a portion of grooves 188 that is substantially parallel in direction to conduit 70. After reaching the corner of the L-shaped groove 118, the connector is given a twist and pins 114 move in a plane substantially perpendicular to conduit until reaching recessed portion 116. Of course, those skilled in the art will recognize that grooves 118 could have other shapes including an inclined shape. As well, pins 114 could be attached to base 22A and grooves 118 located in adaptor receiver portion 106. Alternatively, other structures could be used for holding base 22A into adaptor receiver portion 106 including a swage connection.

Adaptor receiver 104 includes aperture 112 through which follower extended cylindrical portion 62A can transmit pressure to boss 66. Therefore, due to the construction of adaptor receiver 104, it is possible to make a quick-change connector that is useful even with large temperature changes, high temperatures and/or high pressures.

The foregoing description of the invention has been directed in primary part to particular preferred embodiments in accordance with the requirements of the patent statutes and for purposes of illustration. It will be apparent, however, to those skilled in the art that many modifications and changes may be made without departing from the scope and spirit of the invention. Therefore, the invention is not restricted to the preferred embodiment illustrated but covers all modifications which may fall within the scope of the following claims.

What is claimed is:

1. An apparatus for connecting a first conduit having a first bore to a second conduit having a second bore to provide communication between said first and second bore comprising:
   a base;
   means to attach said base to said first conduit;
   a cap, said second conduit extending through said cap;
   a follower slidably disposed in said cap, said follower having a passageway therethrough, said second conduit extending through said passageway;
   a ferrule having an aperture therethrough with internal walls into which said second conduit is removably disposed so as to receive said ferrule onto said second conduit, said ferrule aperture being oversize with respect to said second conduit so that a flow path exists between said internal walls and said second conduit, said ferrule having a first end and a second end, at least a portion of said ferrule having a deformable cross-section;
   biasing means operative to urge said follower against said first end of said ferrule;
   said first bore in said first conduit having a frustoconical surface defining receiving formation for said ferrule, said second end of said ferrule having a portion which is circular when viewed in transverse cross section such that when said second end of said ferrule is urged into said receiving formation by said biasing means, said ferrule engages said frustoconical surface defining said receiving formation in substantially line contact; and
   a ferrule forming means operative to create a forming pressure on said ferrule so as to form an initial seal between said internal walls of said ferrule aperture and said second conduit, said biasing means urging against said ferrule to preserve said seal when said ferrule forming means no longer applies a pressure adequate to maintain a seal.

2. The apparatus of claim 1, wherein said ferrule forming means threadably engages said cap and has a thrust surface operative to bear against an opposing thrust surface on said follower, said opposing thrust surface of said follower being disposed distal said ferrule.

3. The apparatus of claim 1, wherein said means for attaching said base to said first conduit includes:
   an adaptor receiver mounted to said first conduit, said adaptor receiver having an aperture therethrough in communication with said first conduit.

4. The apparatus of claim 3, wherein: said follower protrudes into said aperture in said adaptor receiver.

5. The apparatus of claim 3, further comprising: a quick-lock connection mounted upon said adaptor receiver.

6. The apparatus of claim 5, wherein: said quick-lock connection includes at least one locking pin affixed to said adaptor receiver, said base having at least one respective groove disposed therein into which said locking pin projects.

7. The apparatus of claim 6, wherein said biasing means is also operative to bias said locking pin to remain within a recessed portion of said groove.

8. An apparatus for connecting a first conduit having a first bore to a second conduit having a second bore to provide communication between said first and second bore comprising:
   a base;
   an adaptor receiver mounted to said first conduit for removably receiving said base, said adaptor receiver having an aperture therethrough in communication with said first conduit;
   a cap, said second conduit extending through said cap;
   a follower slidably disposed in said cap and protruding into said aperture in said adaptor receiver, said follower having a passageway therethrough, said second conduit extending through said passageway;

a ferrule received on said second conduit, said ferrule having a first end and a second end;

biasing means operative to urge said follower against said first end of said ferrule;

said first bore in said first conduit having a frustoconical surface defining receiving formation for said ferrule, said second end of said ferrule having a portion which is circular when viewed in transverse cross section such that when said second end of said ferrule is urged into said receiving formation by said biasing means, said ferrule engages said frustoconical surface defining said receiving formation in substantially line contact; and a ferrule forming means operative to create a forming pressure on said ferrule so as to form an initial seal with said second conduit, said biasing means urging against said ferrule to preserve said seal when said ferrule forming means no longer applies a pressure adequate to maintain a seal.

9. The apparatus of claim 8, wherein said removable reception of said base into said adaptor receiver includes a quick-lock connection.

10. The apparatus of claim 9, wherein said quick-lock connection includes at least one locking pin affixed to said adaptor receiver; and said base having at least one groove, said locking pin projecting into said groove to prevent movement of said base with respect to said adaptor receiver in a direction substantially parallel with said first and second conduits.

11. The apparatus of claim 10, wherein said biasing means is also operative to bias said locking pin to remain within a recessed portion of said groove.

* * * * *